United States Patent [19]

Bowers et al.

[11] Patent Number: 4,753,511
[45] Date of Patent: Jun. 28, 1988

[54] OPTICAL CONNECTOR AND ADAPTOR KIT FOR SELECTIVE ATTENUATION OF SIGNALS IN OPTICAL FIBER CIRCUITS

[75] Inventors: Richard R. Bowers, Rochester; James P. Carroll, Spencerport; Frederick B. Messbauer; Donald A. Stephenson, both of Rochester, all of N.Y.

[73] Assignee: Eastman Kodak Company, Rochester, N.Y.

[21] Appl. No.: 776,235

[22] Filed: Oct. 7, 1985

[51] Int. Cl.⁴ .................................................. G02B 6/38
[52] U.S. Cl. ............................... 350/96.21; 350/96.18; 350/96.20
[58] Field of Search ............... 350/96.15, 96.16, 96.18, 350/96.20, 96.21, 96.22

[56] References Cited

U.S. PATENT DOCUMENTS

| | | | |
|---|---|---|---|
| 4,019,806 | 4/1977 | Fellows et al. | 350/96.20 |
| 4,076,379 | 2/1978 | Chouinard | 350/96.22 |
| 4,130,344 | 12/1978 | Lemonde | 350/96.21 |
| 4,257,671 | 3/1981 | Barbaudy et al. | 350/96.15 |
| 4,261,640 | 4/1981 | Stankos et al. | 350/96.15 |
| 4,303,301 | 12/1981 | Teichert et al. | 350/96.18 |
| 4,421,383 | 12/1983 | Carlsen | 350/96.20 |
| 4,475,788 | 10/1984 | Tomassini et al. | 350/96.20 |
| 4,484,793 | 11/1984 | Laude | 350/96.20 |
| 4,516,827 | 5/1985 | Lance et al. | 350/96.15 |
| 4,519,671 | 5/1985 | Curtis et al. | 350/96.15 |
| 4,666,243 | 5/1987 | Rogstadius et al. | 350/96.21 |
| 4,714,317 | 12/1987 | Szentesi | 350/96.21 |
| 4,717,234 | 1/1988 | Barlow et al. | 350/96.21 |
| 4,723,830 | 2/1988 | Messbauer | 350/96.20 |

FOREIGN PATENT DOCUMENTS

| | | | |
|---|---|---|---|
| 53-69050 | 6/1978 | Japan | 350/96.20 |
| 54-68651 | 6/1979 | Japan | 350/96.15 |
| 55-73002 | 6/1980 | Japan | 350/96.15 |
| 56-85704 | 7/1981 | Japan | 350/96.15 |
| 56-138706 | 10/1981 | Japan | 350/96.21 |
| 56-161506 | 12/1981 | Japan | 350/96.18 |

OTHER PUBLICATIONS

Masuda, "Variable Attenuator for . . . Systems" applied optics, vol. 19, No. 14, 7/80, pp. 2435–2438.

Primary Examiner—William L. Sikes
Assistant Examiner—Brian M. Healy
Attorney, Agent, or Firm—John B. Turner

[57] ABSTRACT

A selected value of attenuation can be inserted in an expanded beam fiber optic connector or coupling component. The attenuator includes a spacer member having planar ends slightly inclined to one another so that the axes of the lenses in the two halves of the connection are caused to be misaligned when the spacer member is disposed between the lenses. An adapter kit is disclosed for modifying an existing connector lacking the ability to selectively attenuate. The kit includes a housing extension member and a spacer member.

19 Claims, 9 Drawing Sheets

OPTICAL CONNECTOR AND ADAPTOR KIT FOR SELECTIVE ATTENUATION OF SIGNALS IN OPTICAL FIBER CIRCUITS

BACKGROUND OF THE INVENTION

1. Field of the Invention

This invention relates to optical fiber communication circuits and more particularly to controlled attenuation of the intensity of signals in such circuits.

2. Description of the Prior Art

Connections between two fibers are known which include butting the fibers end to end. Because the location of the core within the cladding is random, it is very difficult to achieve juxtaposition of the centers of the end faces of the two cores, as is needed if the loss in the connection is to be tolerable. Not only do the ends of the two cores have to be juxtaposed perfectly but the axes of the two cores adjacent the connection have to be aligned, i.e. they must not have an inclination to one another.

A known type of connection between two fibers or between one fiber and a device such as a splitter, transmitter or receiver is termed an "expanded beam" connection. In such a connection the beam of light leaving a fiber is expanded to a greater diameter and is collimated for transmission towards another fiber or to a device. If the recipient of the transmitted expanded beam is to be another fiber, the beam is focussed by a lens onto the end of the other fiber, i.e. the diameter of the beam is again reduced. As is known, the expanded beam type of connection is advantageous in that lower losses are readily achieved.

It is known that the efficiency of a circuit decreases with age and that if the power of a signal source is adequate at the beginning of the life of the circuit, later in the life the power may be inadequate. For example, it is known that the output of laser diodes decreases with age. If the power of the signal at the beginning of the life was chosen so that it was still adequate at the end of the circuit's life, components of the circuit might be saturated early in the life. Thus, it is desirable to design the circuit so that the power is adequate at the end of the circuit's life and to build in attenuation as and where necessary to avoid saturation. As the circuit ages the built-in attenuation may be progressively decreased.

SUMMARY OF THE INVENTION

It is an object of the present invention to enable the designer of an optical fiber communication circuit to include attenuation where needed, which attenuation can be readily varied at will both initially and throughout the life of the circuit.

The present invention provides attenuation in an expanded beam connection by providing a light transmitting spacer member which creates a small controlled tilt of the two components of the connection relative to one another. The spacer member can be replaceable with another providing a different angle of tilt to provide different attenuation, for example lesser attenuation, which might be desirable as a circuit ages.

According to the present invention there is provided an attenuator for attenuating the intensity of a signal in an optical fiber circuit which includes a transmitter or receiver and lens means connected to the end of an optical fiber. The lens means is spaced from the transmitter or receiver. The optical signal passes between the transmitter or receiver and the lens means in a beam having a diameter greater than that of the core of the fiber. The attenuator includes a light transmitting spacer member for location between the transmitter or receiver and the lens means. The spacer member is formed of rigid material and has planar end faces which are other than parallel to one another. The spacer member with its non-parallel end faces causes an inclination of the axis of the lens means and the axis of the transmitter or receiver whereby the signal is attenuated relative to the signal which would be passed in the absence of the spacer member and the misalignement caused by it.

The spacer member may have a bore extending between its two end faces for the transmission of the optical signal through the spacer means. This has the advantage that the material of the spacer member may be opaque which widens the range of materials which may be used for the spacer member and further it avoids problems created by reflection from the surface of the spacer member as the signal enters the spacer member. While anti-reflection coatings are known, their use necessitates an extra manufacturing step. Further their durability on some materials is less than desirable.

Alternatively, the spacer member may be made of transparent material. This has the advantage that the material is refractive and the light beam passing through an end face of the spacer member which is inclined to a plane perpendicular to the axis of the spacer member is refracted, thereby promoting misalignment and, thereby, attenuation.

Both the transmitter or receiver and the lens means may have planar surfaces facing one another and perpendicular to the axis of the respective transmitter or receiver and lens means. In such a case the spacer member has planar end faces which are other than parallel to one another. The spacer member serves to cause the planar surfaces of the transmitter or receiver and the lens means to be non-parallel when the transmitter or receiver and the lens means are biased towards one another with the attenuator interposed.

In one embodiment first spacer means are interposed between the planar surface of the lens means and one end surface of the spacer member and second spacer means are interposed between the planar surface of the transmitter or receiver and the other end surface of the spacer member.

The present invention also resides in an adaptor kit for adding attenuation to a connection in an optical fiber circuit, which connection includes lens means connected to an optical fiber for transmitting or receiving a beam of light having a diameter greater than that of the core of the fiber. The connection also includes a transmitter or receiver for transmitting light to or receiving light from said lens means. Both the transmitter or receiver and the lens means have planar surfaces facing one another and perpendicular to the axis of the transmitter or receiver and of the lens means, respectively. Means are provided for biasing the transmitter or receiver and the lens means towards one another. There are spacer means located between the planar surfaces of the transmitter or receiver and the lens means for maintaining the planar surfaces spaced and parallel in the presence of the influence of the biasing means. There are housing means for maintaining alignment of the optical axes of the transmitter or receiver and the lens means laterally of the axes and permitting a small degree of tilt of the lens means. The housing means includes a first housing part associated with the transmitter or receiver and a second housing part associated with the lens means. The first and second housing parts are connectable and disconnectable. The adaptor kit for such a connection, in accordance with the present invention, includes a housing extension for location between the first and second housing parts, means for connecting the housing extension to the first and second housing parts and a light transmitting spacer member for location between the transmitter or receiver and the lens means. The spacer member is formed of rigid material and has planar end faces which are other than parallel to one another. The kit also includes an additional spacer means which together with the first-mentioned spacer means serves to space the spacer member from both the transmitter or receiver and the lens means and maintain one end face of the spacer member parallel to the planar face of the transmitter or receiver and maintain the other end face of the spacer member parallel to the planar face of the lens means in the presence of the influence of the biasing means. Such an adaptor kit allows a selected value of attenuation to be retrofitted to an expanded beam connection in a fiber optic circuit. It also allows the attenuation to be varied by interchanging the spacer member with one having a different inclination of the end faces to one another.

The present invention also resides in an attenuating connector for coupling two optical fibers, including two coupling components and an intermediary member of tubular form for connecting the two coupling components. Each of the coupling components includes lens means having a forward surface and a rearward surface and a circumferential surface between said forward and rearward surfaces. The forward surface has a convex surface portion and an annular plano portion radially outwardly of the convex surface portion. There are means defining a datum axis. The plane of the annular plano portion is perpendicular to the datum axis and constitutes a datum plane. There are means for securing an optical fiber to the rearward surface of the lens means such that light emitted from the fiber is transmitted by the lens means in a collimated beam of a width greater than the diameter of the core of the fiber and with its axis parallel to said datum axis. The circumferential surface of the lens means is coaxial with the datum axis. A sleeve member is disposed about the circumferential surface of the lens means and has an inner circular cylindrical surface in contact with the circumferential surface of the lens means in a cylindrical region of short axial length. This region of contact of short axial length acts like a gimbal and allows the lens means to tilt to a small extent while accurately locating it transversely of the datum axis. Biasing means are provided for biasing the lens means forwardly relative to the sleeve member. Connecting means are provided which cooperate with the intermediary member for connecting the coupling component to the intermediary member. The intermediary member has cooperating means for cooperating with each of the connecting means of the two coupling components. The intermediary member also has an internal bore and a spacer member insertable in and withdrawable from the internal bore. The spacer member has planar end faces. The first spacer means are located between one of said planar end faces of said spacer member and the annular plano portion of one of said lens means. Second spacer means are located between the other of the planar end faces of the spacer member and the annular plano portion of the other of the lens means. Each of the spacer means serves to maintain parallelism of its respective planar end face and annular plano portion when the leans means are biased towards the spacer member by the biasing means.

BRIEF DESCRIPTION OF THE DRAWINGS

A preferred embodiment of the present invention will now be described, by way of example, with reference being made to the accompanying drawings, in which:

in FIGS. 1–5:

FIG. 1 is an elevational view, partially broken away for the sake of understanding, of the optical fiber connector;

FIG. 2 is a view similar to FIG. 1 but with parts of the connector spaced away from one another prior to effecting the connection of the optical fibers;

FIG. 3 is a perspective view of spacer means included in the connector illustrated in FIGS. 1 and 2;

FIG. 4 is a partial section taken on line 4—4 in FIG. 2 showing keys and keyways; and FIG. 5 is an enlarged section of a portion of the connector illustrated in FIG. 1;

DESCRIPTION OF PREFERRED EMBODIMENT

Figure 1:
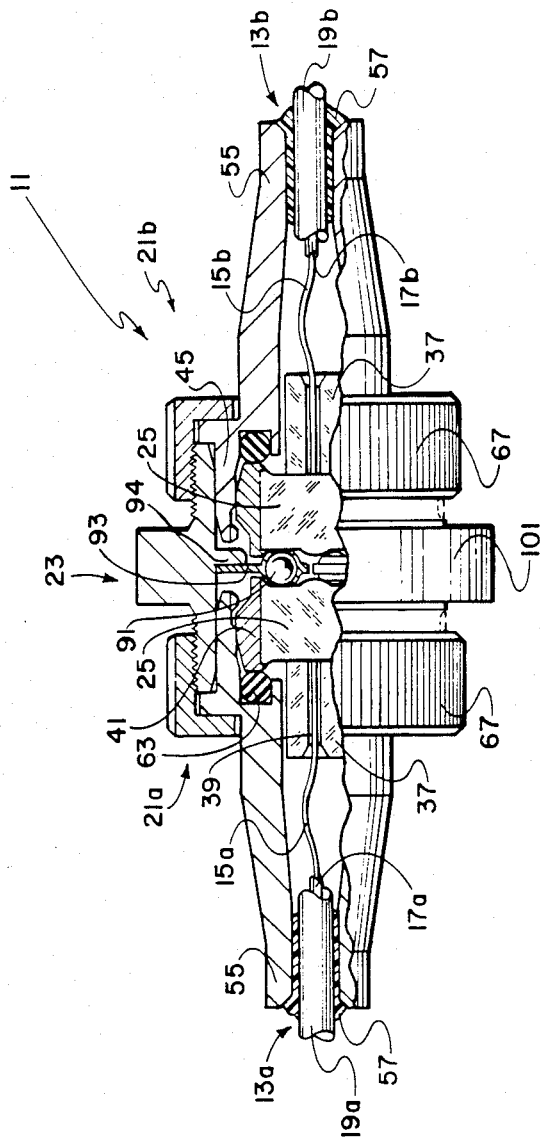
FIGS. 1 to 5 illustrates an optical fiber connector as disclosed in U.S. patent application Ser. No. 623,660 filed in the name of Frederick B. Messbauer on June 22, 1984, now U.S. Pat. No. 4,723,830, without the addition of an attenuating adapter in accordance with the present invention.

The term "datum axis" as herein used is defined as (a) in the case of the convex surface of the lens being aspheric, the aspheric axis, (b) in the case of the convex surface of the lens being spheric and the rearward surface of the lens having a plano operative portion, the line passing through the center of curvature of the spheric surface and perpendicular to the plane of the plano portion of the rearward surface, or (c) in the case of the convex surface of the lens being spheric and the rearward surface of the lens having a curved operative portion, the line passing through the centers of curvature of the spheric surface portion of the forward surface and of the curved operative portion of the rearward surface.

Illustrated in FIGS. 1 to 5 of the drawings is a connector 11 optically coupling two optical fiber conductors 13a, 13b, and which is disclosed in U.S. patent application Ser. No. 623,660 filed in the name of Frederick B. Messbauer on June 22, 1985, now U.S. Pat. No. 4,723,830, the disclosure of which is specifically incorporated herein by reference. Each conductor 13a, 13b, comprises an optical fiber 15a, 15b surrounded by a buffer 17a, 17b in turn surrounded by a sheath 19a, 19b, in known manner. End portions of the fibers 15a, 15b are bared for connection.

The connector 11 comprises two identical coupling components 21a, 21b and an intermediary member 23. As the coupling components are identical a description of one will suffice.

The coupling component 21a includes lens means including a lens 25 formed of a refractive material, in the present example, glass, and having a rearward surface, which is substantially plano in at least an operative central region 27, and a forward surface 29. The forward surface 29 has a convex surface portion 31 which in the present example is spheric. In other examples the portion 31 is aspheric. Radially outwardly of the portion 31 is a plano annular portion 33 to which the rearward plano surface region 27 is substantially parallel. The term "radially outwardly" is intended to describe distance from the axis and not relative positions along the axis. The plane of the plano annular portion 33 is termed the datum plane. A datum axis 34 in the present example, in accordance with the definition given above, is the line passing through the center of curvature of the spheric surface and perpendicular to the plane of the plano central region 27 of the rearward surface. The datum axis and datum plane are perpendicular. A circumferential surface 35 extends between the forward and rearward surfaces and, in the present example, is of generally circular cylindrical shape having an axis approximately coaxial with the datum axis 34. Abutting the rearward plano surface region 27 of the lens 25 is a tubular element 37 formed, in the present example, of glass transparent to ultraviolet light, and having an axial bore 39 in which is disposed a bared end portion of the fiber 15a. For the purpose of illustration, the bore 39 is shown with a diameter much greater than that of the fiber. This is not the case in reality. For example, the bore may have a 0.017 cm diameter and the fiber may have a 0.012 cm diameter. The end of the fiber is in contact with the lens. The end portion of the fiber, the tubular element 37 and the lens are bonded together by cement 40 having a refractive index matching that of the glass of the lens. The location of the end of the fiber relative to the convex surface portion 31 is such that light emitted from the fiber end is transmitted from the convex surface portion in a collimated beam having a diameter larger than that of the fiber and having its axis parallel to the datum axis. The technique for achieving this important condition involves moving the location of the end of the fiber, in contact with the lens, until a test apparatus shows that light emitted by the fiber end is transmitted by the convex surface portion as a collimated beam with the axis of the beam parallel to the datum axis. When this condition is achieved, ultraviolet light is applied to the uncured cement around the fiber end, the cement being of a type curable by ultraviolet light.

The forward surface of the lens has an anti-reflection coating.

The lens means also includes ring member 41 which is fixedly disposed around the circumferential surface of the lens and is secured to the lens so that relative movement of the ring member and the lens is prevented. The ring member is formed of plastics material and is molded in situ onto the lens. The ring member 41 has an outer surface 43 of circular cylindrical shape, the orientation of the axis of which is coaxial with the datum axis. Thus, whatever may be the shape of the circumferential surface 35 of the lens, the ring member 41 provides a surface, the surface 43, for the lens means which is cylindrical and coaxial with the datum axis.

The lens means, consisting of the lens 25 and the ring member 41, is disposed radially within a sleeve-like end portion 45 of a tubular member 47. The portion 45 has a circular cylindrical inner surface 49 which is in mating surface to surface engagement with the surface 43 of the ring member over a cylindrical region of short axial length. Movement of the ring member 41 out of the end portion 45 of the tubular member (to the right as seen in FIG. 1), is prevented by inwardly directed resiliently mounted teeth 51 on the tubular member.

The end portion 45 of the tubular member 47 has a circular cylindrical external surface 53 coaxial with its inner surface 49.

End portion 55 of the tubular member 47 remote from its end portion 45, is formed to allow physical connection between the tubular member 47 and the sheath 19a or 19b of the conductor. In the present example, the physical connection is achieved by mastic 57, but it may also be achieved in other ways, for example, by a resilient or split collar compressible or deformable by a nut threadedly engaged with the tubular member.

The tubular member 47 has a forwardly facing annular recess 59 the bottom of which is formed by a forwardly facing annular shoulder 61. Disposed in the recess 59 is an O-ring 63 of resilient material. A rearwardly facing annular surface 65 on the ring member 41 faces the O-ring 63.

Each coupling component 21a, 21b also includes a collar nut 67 having a forwardly facing annular surface 69 engageable with a rearwardly facing annular surface 71 on the tubular member 47. The collar nut 67 has internal threads 73.

The two coupling components 21a, 21b are physically connected by the intermediary member 23 which has inner cylindrical surfaces 75 for mating telescopic engagement with the external surfaces 53 of the tubular members 47. The intermediary member 23 also has external threads 77 for cooperation with the internal threads 73 of the collar nuts 67.

The coupling components 21a, 21b can be drawn towards one another by rotation of the collar nuts 67 relative to the intermediary member 23 when the threads 73 and 77 are engaged with one another.

Figure 4:
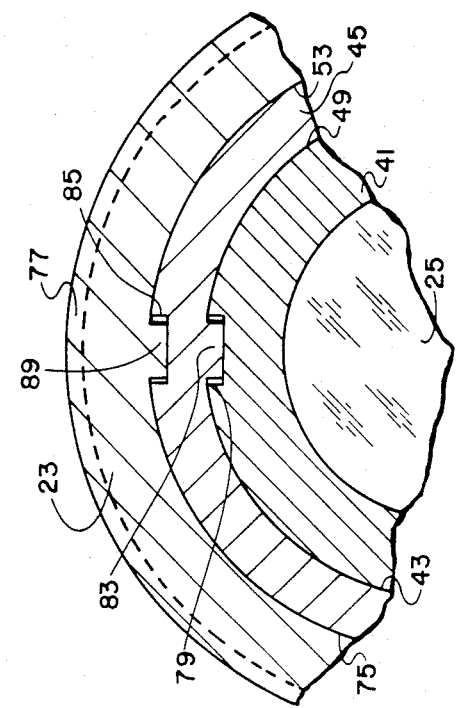
Figure 5:
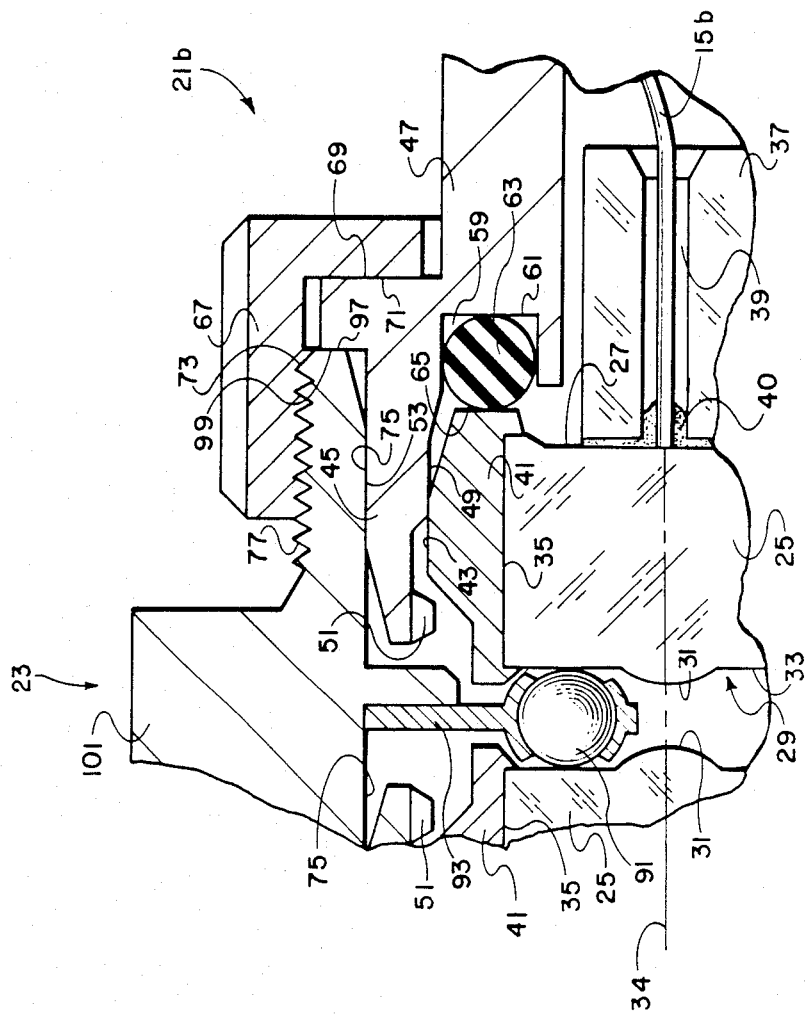

The outer surface 43 of the ring member 41 has a keyway 79 and the inner surface 49 of the tubular member 47 has a key 83 extending into the keyway 79, see FIG. 4. The external surface 53 of the tubular member 47 has a keyway 85 and the inner surface 75 of the intermediary member 23 has a key 89 extending into the keyway 85. The keys and keyways are axially extensive allowing relative axial movement of the ring member, tubular member and intermediary member, but are so formed as to prevent relative rotational movement about the datum axis, of the ring member, tubular member and intermediary member. Thus, the angular orientation of the fibers relative to one another is controlled once they have been cemented to their respective lens.

The plano annular portions 33 of the forward surfaces of the lenses are held apart in parallel, spaced relationship (i.e., the datum planes are held parallel) by spacer means including three spheres 91 of incompressible material, in the present example, steel, having substantially identical diameters. The spheres 91 are retained in a cage 93 formed of thin flexible plastic material, and are in mutually spaced disposition about the datum axis. In the present example they are at 120° to one another. The cage 93 includes a continuous annulus 96 and three lobes 95 extending radially inwards from, and integral with, the annulus. Each lobe carries a sphere. The external diameter of the annulus is such that the cage fits with minimal play within one of the cylindrical surfaces 75 of the intermediary member 23. The cage is located axially within the intermediary member 23 by abutting against an annular rib 94. The cage resists movement of the spheres radially relative to the datum axis and circumferentially about the datum axis. However, the cage imposes minimal opposition to movement of the spheres axially, with respect to the remainder of the coupling, out of their positions when the cage is unflexed. The minimization of the axially directed forces applied by the cage on the spheres minimizes any influence the cage might have on one or the other (or both assymmetrically) of the lens means.

As described above, appropriate rotation of the collar nuts 67 draws the lens means towards one another. The approach of the lens means towards one another is terminated when the forward surfaces of the lenses contact all spheres. Further rotation of the collar nuts causes compression of the O-rings 63. Compression of the O-rings is limited by engagement of annular shoulders 97 on the tubular member 47 with end surfaces 99 of the intermediary member. Any further rotation of the collar nuts 67 after engagement of the shoulders 97 with the surfaces 99 serves to put the threads 73 and 77 under stress thereby locking the collar nuts 67 with the intermediary member 23 so that the connector does not unintentionally come apart.

The intermediary member 23 is, for the purpose of illustration, shown with an enlarged central portion 101. This central portion may take any convenient form such as a flange for mounting on a panel or for connection to flanges of other similar connectors. Also, it may be provided with a tool-engaging surface, such as a hexagonal surface for cooperation with a wrench, for example, for holding the intermediary member against rotation as the collar nuts 67 are tightened onto it.

It is stated above that the axial extent of the cylindrical region of contact of the outer surface 43 of the ring member 41 with the inner surface 49 of the tubular member is small. As an example, the aforesaid axial extent may be 0.050 to 0.075 cm in a connector in which the thickness of each lens is 0.5 cm, and the diameter of the cylindrical outer surface 43 of the ring member 41 is 1 cm. The axial extent of the region of contact is short in order to minimize any influence which the tubular member might exert, through such contact, which might tend to destroy parallelism of the datum axes. The region of contact, with small axial extent, might be likened to a gimbal. Thus, the short axial extent of the region of contact allows small freedom of the datum axis to tilt relative to the sleeve member. The region of contact is, however, fully adequate for the lateral positioning of the datum axis to be determined by the tubular member.

The intermediary member and tubular members are molded from rigid plastics material.

It will have been realized that parallelism of the datum planes is achieved by the spheres 91, the plano annular surface portions 33 and the resilient O-rings 63. Coincidence of the parallel datum axes is achieved by making the circular cylindrical surfaces 43, 49, 53, 75 coaxial.

The connector described above with reference to FIGS. 1 to 5 is for optically coupling two optic fibers. A coupling component as described above may be used for optically coupling an optic fiber to another device, such as a terminal device, such as a transmitter or receiver, or a splitter, as well as to another fiber. Indeed, in a connector connecting two fibers, one of the coupling components is a transmitter and the other is a receiver. Thus, even a connector connecting two optical fibers may be regarded as connecting an optical fiber to another device.

When a single coupling component, such as is described above, is used for coupling a fiber to another device, the coupling component would be physically connectible to the other device which would have a plano surface corresponding in function to the plano annular surface 33. Spacer means, such as spheres 91 and cage 93, would be interposed between the plano annular surface 33 of the coupling component and the corresponding plano surface of the device. The device would have a cylindrical surface, coaxial with a datum axis of the device, for direct or indirect cooperation with a cylindrical surface on the coupling component, such as surface 53. Preferably, the light source or receiver of the device would be mounted in the device in a manner similar to that in which the lens 25 and its ring member 41 is mounted in the tubular member as described above.

Figure 6:
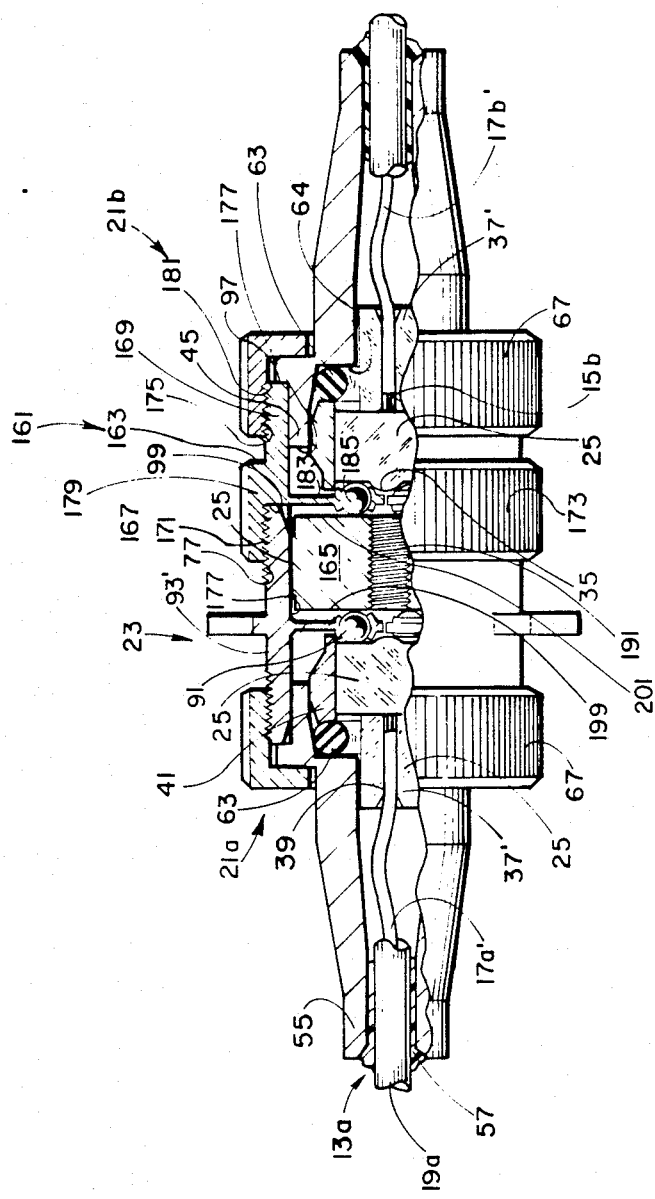
FIG. 6 is a view similar to FIG. 1 but with an attenuating adaptor according to the invention included in the connector.
Figure 7:
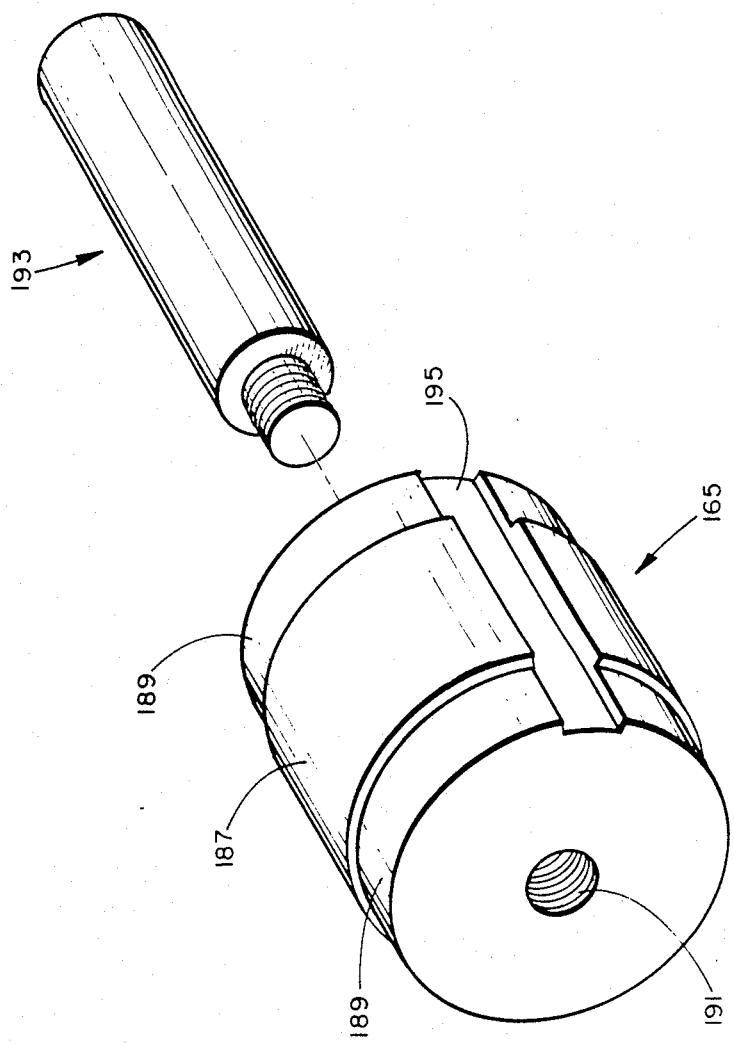
FIG. 7 is a perspective view of a spacer member forming part of the attenuating adaptor included in the connector illustrated in FIG. 6, with a tool used for manipulating the spacer member.
Figure 8:
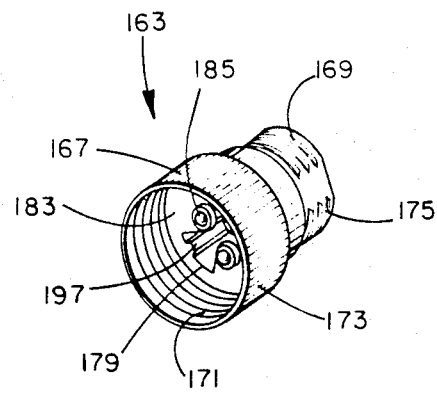
FIG. 8 is a perspective view of a housing extension member forming another part of the attenuating adaptor included in the connector illustrated in FIG. 6.

FIG. 6 illustrates a connector very similar to that illustrated in FIGS. 1 to 5 but with the addition of an attenuator adaptor 161. One of the differences between the connector illustrated in FIG. 6 and that illustrated in FIGS. 1 to 5, but not specifically related to the attenuator adaptor, is that the cage 93' is formed integrally with the intermediary member 23 and, consequentially, the annular rib 94 is omitted in the connector illustrated in FIG. 6. Another such difference is that in the connector illustrated in FIG. 6 the buffer 17a', 17b' extends into the axial bore in the tubular element 37' instead of terminating outside the bore. The bore is larger to accommodate the buffer. There is a short exposed end portion of fiber extending from the end of the buffer.

Another such difference is that instead of the O-rings 63 being disposed in forwardly facing recesses 59, the O-rings in the connector illustrated in FIG. 6 bear against a radial planar surface 64 and are constrained against radially outward deformation but not against radially inward deformation. This means that the O-rings in the FIG. 6 connector are, in effect, softer than their counterparts in the FIG. 1 connector.

Another such difference is that the teeth 51 for retaining the lens 25 in the sleeve-like end portion of the tubular member 47 of each of the coupling components 21a, 21b in the connector illustrated in FIGS. 1 to 5 is omitted in the connector illustrated in FIG. 6.

The attenuator adaptor 161 included in the connector illustrated in FIG. 6 includes a housing extension member 163 and a spacer member 165. The extension member 163 is tubular and includes a larger diameter portion 167 and a smaller diameter portion 169. The larger diameter portion 167 has internal threads 171 for cooperation with the external threads 77 of the intermediary member 23. The larger diameter portion 167 also has external knurling 173 to improve manual gripping. The smaller diameter portion 169 has external threads 175 for cooperation with the internal threads 73 of the collar nut 67.

The smaller diameter portion 169 of the extension member 163 has an inner cylindrical surface 177 having the same diameter as the inner cylindrical surface 75 of the intermediary member 23.

The extension member 163 has an annular shoulder 179 at the inner end of the internal threads 171 for cooperation with the end surface 99 as did the annular shoulder 97 of the tubular member 47 before the insertion of the adaptor member. The extension member 163 has an end surface 181 at its smaller diameter end for cooperation with the annular shoulder 97 as did the end surface 99 before the insertion of the adaptor member.

Figure 3:
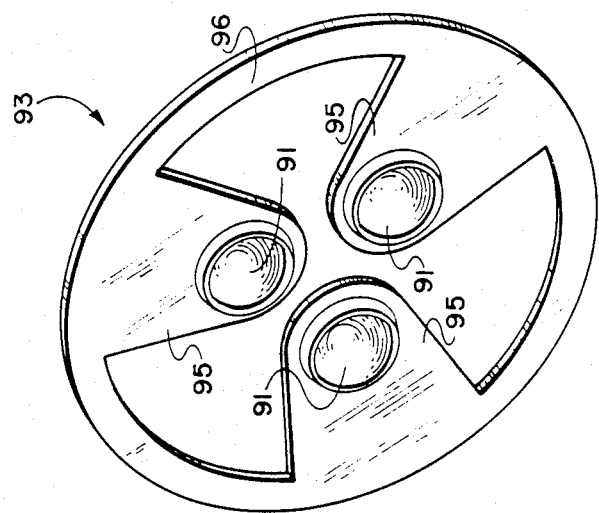

The extension member 163 includes a cage 183 generally similar to the cage 93 illustrated in FIG. 3 except that it is integral with the remainder of the extension member 163 rather than being formed as a separate, washer-like element. The cage 183 carries spacer means including three spheres 185. For a full understanding of the cage 183 and spheres 185 reference should be made to the description above concerning the cage 93 and spheres 91.

When the extension member 163 is in position and connected to the intermediary member 23, it presents to the coupling component 21b external threads 175, end surface 181 and an inner cylindrical surface 177 substantially similar to the external threads 77, inner cylindrical surface 75 and end surface 99, respectively, which the intermediary member presents to the coupling component 21b in the absence of the attenuator adaptor 161. Also, the spheres 185 are at the same distance in from the end surface 181 as are the spheres 91 from the end surface 99. When the extension member 163 is in position on and connected to the intermediary member 23, the axis of the inner cylindrical surface 177 is aligned with the axis of the inner cylindrical surface 75 of the intermediary member 23. Aligned in this context means absence of lateral displacement of the two axes and absence of inclination of one axis to the other.

The spacer member 165 is of cylindrical form and its outer surface has a cylindrical band 187 at the middle of its length and two slightly smaller diameter bands 189 adjacent and contiguous with the ends of the member 165. The member has an axial bore 191 which is threaded for connection to an insertion and withdrawal tool 193.

Prior to the extension member 163 being brought up to and threadedly connected to the intermediary member 23, the spacer member 165 is inserted in the intermediary member 23.

The diameter of the cylindrical band 187 is such that the spacer member is a push fit with the intermediary member as was the sleeve-like end portion 45 of the coupling component 21b. After the tool 193 has been used for inserting the spacer member 165 into the intermediary member, it is unthreaded from the spacer member so that the bore 191 is clear.

With the attenuator adaptor in place, the sleeve-like end portion 45 is now disposed in the smaller diameter portion 169 of the housing extension member 163. The spacer member 165 has a keyway 195 for cooperation with the key 89 provided on the inner cylindrical surface 75 of the intermediary member 23.

The inner cylindrical surface 177 of the extension member has a key 197 for cooperation with the keyway 85 on the sleeve-like end portion 45 of the tubular member 47.

The length of the spacer member 165 is such that with both cages 93' and 183 in unflexed conditions, the spheres 91 and 185, respectively, in the cages contact the end faces 199 and 201 of the member 165.

The end face 199 is perpendicular to the axis of the spacer member 165 but the end face 201 has a slight inclination to a plane perpendicular to the axis of the spacer member. The actual inclination determines the extent of the attenuation. The length of the spacer member measured along the axis thereof is constant whatever the inclination of the end face 199.

Figure 9:
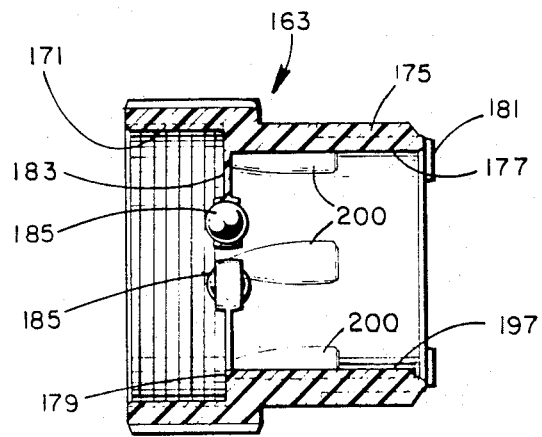
FIG. 9 is a sectional view taken in a plane containing its axis of the housing extension member illustrated in FIG. 8.

As can be seen in FIG. 9, the inner cylindrical surface 177 of the extension member is provided with some axially extensive radially thin ribs 200. Those skilled in the art of plastics molding know that it is very difficult to achieve a truly cylindrical internal surface in a relatively thin-walled plastics component because of distortions during setting and/or cooling. The ribs 200 are a known way of generating a cylindrical boundary relatively accurately and easily. The high zones (i.e., radially innermost surface portion) of the ribs conform to a truly circular cylinder of the desired diameter for accurately mating with the external surface 53. Thus, the inner cylindrical surface 177 is, insofar as its cooperation with the surface 53 is concerned, a hypothetical cylinder which touches the high zones of each of the ribs 200. The ribs, of course, derive from depressions in the mold. As is known, it is much easier to 'tune' the depressions to achieve ribs which conform to a cylinder than it is to achieve a complete cylindrical surface.

The cylindrical surfaces 75 in the intermediary member 23 are also formed by ribs like the ribs 200 and the surface from which the ribs project has a draft to facilitate molding. It is to accommodate the draft that the spacer member 165 has the smaller diameter surface portions 189. It is the larger diameter surface portion 187 which contacts the ribs. The smaller diameter portions are provided adjacent both ends so that the spacer member can be inserted either end first.

With the attenuator adaptor in place, as shown in FIG. 6, the plano annular surface portion 33 is biased into contact with the spheres 91 which, in turn, are in biased contact with the plano annular surface portion 33 of the lens 25. These biases are created by the O-rings 63. Because the face 199 is perpendicular to the axis of the spacer member, there is no tilt between the datum axis of the lens 25 and the axis of the spacer member 165. Because the end face 201 is not perpendicular to the axis of the spacer member there is an inclination of the datum axis of the lens 25 in the coupling component 21b with the axis of the spacer member. The inclination of these two axes is, of course, equal to the inclination of the end face 201 with the plane perpendicular to the axis of the spacer member. The lens 25 in the coupling component 21b is free to tilt by virtue of the small axial extent of the region of contact of the outer surface 43 of its ring member 41 with the circular cylindrical inner surface 49 of the sleeve-like end portion 45 of the tubular member 47.

The spacer member 165 is one of a plurality of spacer members, each of which has an end face 201 with a different inclination. For example, there might be four different spacer members whose end faces 201 have an inclination of 4'30"; 6'; 7'22"; and 8'33" to a plane perpendicular to the axis of the spacer member. These four different spacer members, when used in one particular form of connector, provide attenuations of 5 db; 10 db; 15 db; and 20 db, respectively. The length of each of these spacer members, measured along its axis, is the same.

The inclination of an end face to a plane perpendicular to the axis of the spacer member is determined by the relationship $$T = e^{-(\frac{f\tan\theta}{N\omega_o})^2} \quad (1)$$

wherein

T is the transmission factor (i.e., $T.10^2$ is the percentage of light transmitted)
f is the focal length of the lens
N is the index of refraction of the material of the lens
$\omega_o$ is the $1/e^2$ semidiameter of the gaussian beam within the fiber.
$\theta$ is the angle of inclination of the end face to the plane perpendicular to the axis of the spacer member.

Instead of just one end face being inclined, both end faces could be inclined to a plane perpendicular to the axis of the spacer member. In such a situation the angle $\theta$ derived from relationship (1) above would be shared between the two end faces.

The spacer members 165 described above are formed of metal and have a bore 191 for the transmission of light. The spacer members could be formed of other rigid material which could be transparent. If transparent, the bore 191 might be omitted. In such a case, the refractive index of the material would have to be considered and anti-reflective coatings would be provided on the end faces.

Figure 2:
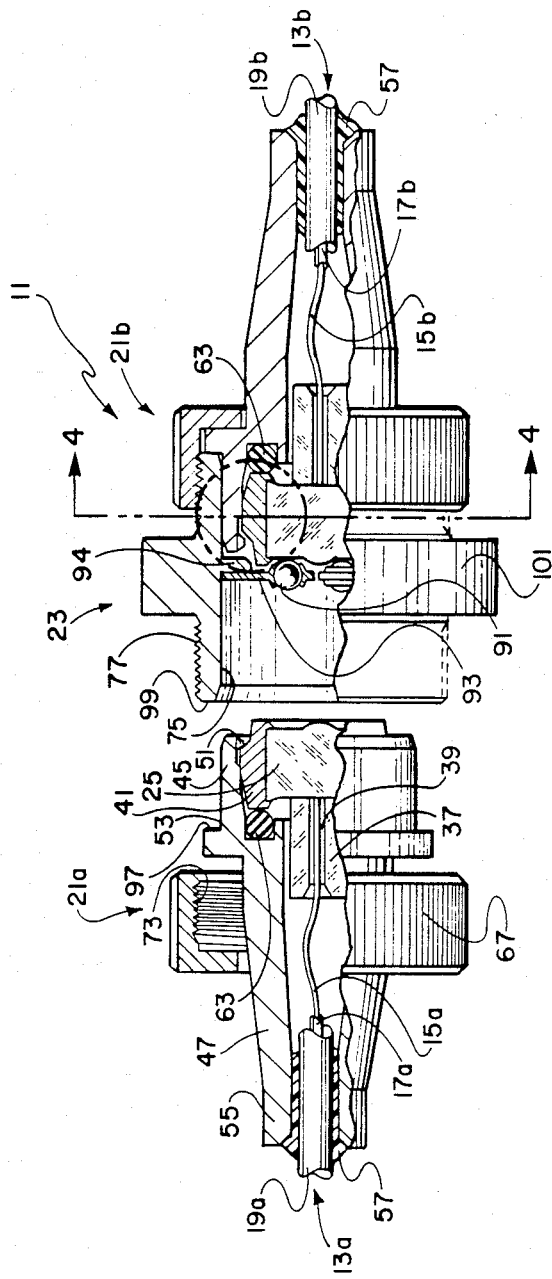

Assuming that a connector as illustrated in FIG. 1 exists, and it is desired to introduce some attenuation into the circuit of which the connector forms a part. Firstly, a spacer member 165 providing the required attenuation is chosen. A tool 193 is threaded into the bore 191 in the spacer member. The right hand coupling component 21b is then disconnected from the intermediary member 23 by unthreading the collar nut 67. FIG. 2 illustrates the condition now achieved although it shows the left coupling component 21a disconnected.

The selected spacer member 165 is inserted in the intermediary member 23 with the key 89 of the latter slidingly engaging the keyway 195 in the spacer member. The spacer member is pushed in, by pushing on the tool 193, until the spacer member contacts the spheres 91. The tool 193 is then unthreaded from the spacer member and is stored. The housing extension member 163 is brought up to and threaded onto the intermediary member until the end surface 99 abuts the annular shoulder 179 and the threads are stressed so that the extension member 163 and the intermediary member do not unintentionally become unthreaded and disconnected.

The sleeve-like end portion 45 of the tubular member 47 is then inserted into the extension member 163 with the key 197 sliding along the keyway 85 of the sleeve-like end portion 45. The collar nut 67 is then brought up to and threaded onto the extension member 163 until the end surface 181 abuts the annular shoulder 97 and the threads are stressed to prevent unintentional loosening of the collar nut from the extension member 163. As the final tightening occurs, the O-rings 63 are deformed which causes bias of the two lenses 25 towards one another so that the lens 25 of coupling component 21a is in biased contact with spheres 91 and those spheres 91 are in biased contact with the spacer member 165, and the spacer member is in biased contact with the spheres 185, and the spheres 185 are in biased contact with the lens 25 of coupling component 21b. The circuit is now re-created but with a selected attenuation introduced. The attenuation is created by the inclination of the datum axis of the lens 25 of coupling component 21a with the datum axis of the lens 25 of coupling component 21b.

It is described above with respect to FIGS. 1 to 5 how a predetermined angular relationship (considered around the axis) of the fibers is achieved by keys and keyways in the components of the connector. This predetermined angular relationship is retained after insertion of the attenuating adaptor by ensuring that when the shoulder 179 abuts the shoulder 97 the fibers have the same angular orientation to one another as they had before insertion of the attenuating adaptor.

If it is desired to change the value of the attenuation, the connector illustrated in FIG. 6 is dissembled by unthreading the extension member 163 from the intermediary member 23. The tool 193 is threaded into the threaded bore 191 in the spacer member 165 and is used to pull the spacer member out of the intermediary member. Another spacer member with a selected, different attenuation value is inserted and the connection is recreated, as described above. If it is desired to reduce the attenuation to zero but to leave the housing extension member 163 in place, a spacer member with both end faces perpendicular to its axis would be inserted.

Figure 10:
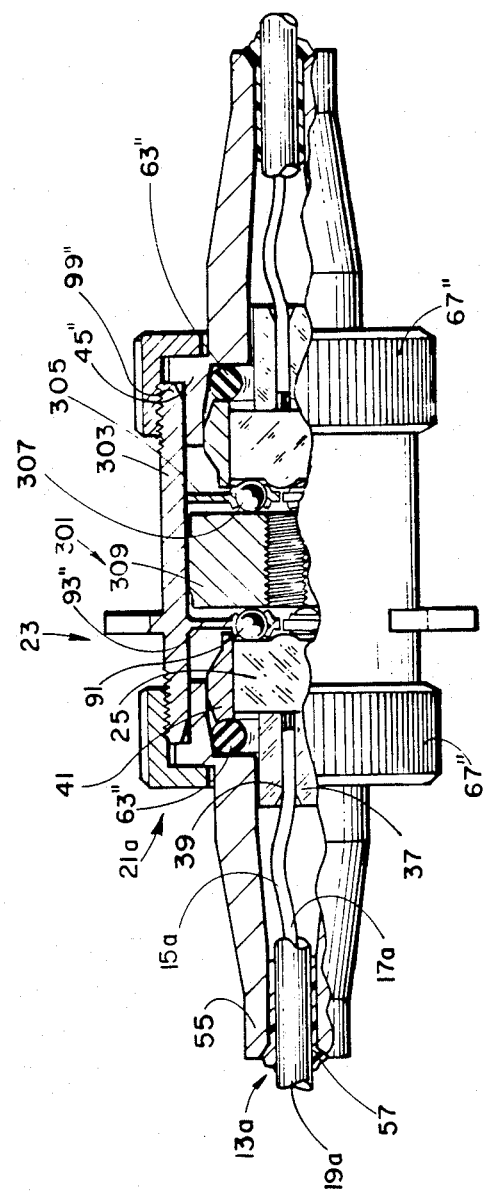
FIG. 10 is a view similar to that of FIGS. 1 and 6 but showing a connector generally similar to that illustrated in FIGS. 1 to 5, but including means for attenuating the signal transmitted by the connector, according to the present invention.

FIG. 10 illustrates a connector 301 which is generally similar to the connector and attenuator adaptor 161 illustrated in FIG. 6 except that the housing extension member 163 is formed integrally with the intermediary member 23 and hence is termed an extended intermediary member 303.

In the connector 301 a separate cage 305, similar to the cage 93, is substituted for the cage 183 integral with the housing extension member 163. The cage 305 carries spheres 307 and for a full understanding of the cage 305 and spheres 307, reference should be made to the description above relating to the cage 93 and spheres 91 in FIGS. 1 to 5.

The connector 301 includes a spacer member 309 similar to the spacer member 165 described above. However, the connector 301 always includes a spacer member 309, therefore the range of different spacer members 309 includes one in which both end faces are perpendicular to the axis of the spacer member. Such a spacer member provides zero attenuation.

In the ensuing description a double prime suffix (″) is added to the reference numerals of parts which are similar to parts in the connector illustrated in FIGS. 1 to 5 and/or FIGS. 6 to 9. For a full understanding of these and other not described features and parts of the connector illustrated in FIG. 10, reference should be made to the preceding description herein.

To change the spacer member 309 to one of a different value the collar nut 67″ is unthreaded from the extruded intermediary member 303 and the sleeve-like end portion 45″ is withdrawn from the extended intermediary member 303. The cage 305 is extracted from the extended intermediary member 303 and then a tool in the form of an extended version of the tool 193 is threaded into the threaded bore in the spacer member 309. The spacer member 309 is then pulled out and one of selected attenuation value is inserted. The tool is unthreaded from the inserted spacer member and removed and stored. The cage is reinserted and the sleeve-like end portion 45″ is reinserted in the extended intermediary member 303. The collar nut is then threaded onto the member 303.

The distance from the cage 93" to the end surface 99" is such that with connector in the assembled condition illustrated in FIG. 10, the O-rings 63" are deformed appropriately for providing proper bias of the lenses, spheres and spacer member together.

The invention has been described above in relation to a connector or coupling component in which the lens has a spherical or aspherical refracting surface projecting forwardly of a plano annular surface. Spheres are used to cause spacing and parallelism of the plano annular surfaces when the two lenses or a lens and another component are biased towards one another. Expanded beam optical fiber connectors are also known in which the refracting surface of the lens element is disposed rearwardly of a plano annular surface. In such connectors the plano annular surfaces of the two lens elements contact one another. The present invention may be embodied in connectors and coupling components which include lens elements with the refracting surface disposed rearwardly of the plano surface. An attenuating spacer member would contact the plano annular surfaces of the lens elements directly.

We claim:

1. An attenuator for attenuating the intensity of a signal in an optical fiber circuit, the circuit including a transmitter or receiver and lens means connected to the end of an optical fiber, the lens means being spaced from the transmitter or receiver, the arrangement being such that the optical signal passes between the transmitter or receiver and the lens means in a beam of greater diameter than that of the core of the fiber, said attenuator including a light transmitting spacer member for location between the transmitter or receiver and the lens means, said spacer member being formed of rigid material and having planar end faces which are other than parallel to one another.

2. An attenuator as claimed in claim 1, wherein said spacer member includes a bore extending between its two end faces for the transmission of the optical signal through the spacer member.

3. An attenuator as claimed in claim 2, wherein the material of said spacer member is opaque to light of the signal.

4. An attenuator as claimed in claim 1, wherein the material of said spacer member is transparent and refractive.

5. An attenuator as claimed in claim 4, including anti-reflective coatings on said end faces.

6. An attenuator for attenuating the intensity of a signal in an optical fiber circuit, the circuit including a transmitter or receiver and lens means connected to the end of an optical fiber, both the transmitter or receiver and the lens means having planar surfaces facing one another and perpendicular to the axis of the respective transmitter or receiver and lens means, the attenuator including a light transmitting spacer member for location between the transmitter or receiver and the lens means, said spacer member being formed of rigid material and having planar end faces which are other than parallel to one another, said spacer member serving to cause said planar surfaces of the transmitter or receiver and the lens means to be non-parallel to the same degree as are the end faces of the spacer member when the transmitter or receiver and lens means are biased towards one another with the attenuator interposed.

7. An attenuator as claimed in claim 6 including first spacer means for location between the planar surface of the lens means and the one end surface of the spacer member, and second spacer means for location between the planar surface of the transmitter or receiver and the other end surface of the spacer member.

8. An attenuator as claimed in claim 6, wherein the spacer member is adapted to contact the planar surface of said lens means and the planar surface of the transmitter or receiver.

9. An adaptor kit for adding attenuation to a connection in an optical fiber circuit, said connection including lens means connected to an optical fiber for transmitting or receiving a beam of light having a diameter greater than that of the core of the fiber, a transmitter or receiver for transmitting light to or receiving light from said lens means, both the transmitter or receiver and the lens means having planar surfaces facing one another and perpendicular to the axis of the transmitter or receiver and the lens means respectively, means for biasing the transmitter or receiver and the lens means relatively towards one another, spacer means located between the planar surfaces of the transmitter or receiver and the lens means for maintaining the planar surfaces spaced and parallel in the presence of the influence of the biasing means, and housing means for maintaining alignment of the axes of the transmitter or receiver and the lens means laterally of the axes and permitting a small degree of tilt of the lens means, said housing means including a first housing part associated with the transmitter or receiver and a second housing part associated with the lens means, the first and second housing parts being connectable and disconnectable, said adaptor kit including a housing extension for location between said first and second housing parts, means for connecting the housing extension to the first and second housing parts, a light transmitting spacer member for location between the transmitter or receiver and the lens means, said spacer member being formed of rigid material and having planar end faces which are other than parallel to one another, and additional spacer means which together with the first said spacer means serve to space said spacer member from both said transmitter or receiver and said lens means and maintain one end facer of said spacer member parallel to said planar face of said transmitter or receiver and maintain the other end face of said spacer member parallel to said planar face of said lens means, in the presence of the influence of said biasing means, whereby said planar face of said transmitter or receiver and said planar face of said lens means are other than parallel and light received by said lens means from said transmitter or received by said receiver from said lens means is attenuated as compared to when the adaptor kit is not in the connection in the optical fiber circuit.

10. An adapter kit as claimed in claim 9, wherein said spacer member includes a bore extending between its two end faces for the transmission of the optical signal through the spacer member.

11. An adapter kit as claimed in claim 10, wherein the material of said spacer member is opaque to light of the signal.

12. An adapter kit as claimed in claim 9, wherein the material of said spacer member is transparent and refractive.

13. An adapter kit as claimed in claim 12, wherein said end faces of said spacer member have anti-reflective coatings.

14. An adapter kit as claimed in claim 10, wherein said bore in said spacer is threaded, and said adapter kit includes a threaded device for threaded engagement in the threaded bore of said spacer member, said threaded device being engageable with the spacer member and being adapted for being grasped to facilitate insertion and withdrawal of the spacer member into and from respectively, the said housing extension.

15. An adapter kit as claimed in claim 9, wherein said spacer member is one of a plurality of spacer members which are generally similar, but differ in the inclination of their end faces, to one another.

16. An adaptor kit as claimed in claim 9, wherein the inclination $\theta$ of an end face of said spacer member to the axis of the spacer member is determined by the relationship $$T = e^{-(\frac{f\tan\Theta}{N\omega_o})^2}$$

wherein
T is the transmission factor
f is the focal length of the lens
N is the index of refraction of the material of the lens
$\omega_o$ is the $1/e^2$ semidiameter of the gaussian beam within the fiber.

17. An attenuating connector for coupling two optical fibers, including:
two coupling components; and
an intermediary member of tubular form for connecting said two coupling components;
each of said coupling components including
lens means having a forward surface and a rearward surface and a circumferential surface between said forward and rearward surfaces, said forward surface having a convex surface portion and an annular plano portion radially outwardly of the convex surface portion, and means defining a datum axis, the plane of said annular plano portion being perpendicular to said datum axis and constituting a datum plane;
means for securing an optical fiber to the rearward surface of said lens means such that light emitted from the fiber is transmitted by a collimated beam of a width greater than the diameter of the core of the fiber and with its axis parallel to said datum axis;
said circumferential surface of said lens means being coaxial with said datum axis;
a sleeve member disposed about said circumferential surface of said lens means and having an inner circular cylindrical surface in contact with said circumferential surface in a cylindrical region of short axial length;
biasing means for biasing the lens means forwardly relative to said sleeve member; and
connecting means for cooperation with said intermediary member for connecting the component to said intermediary member; said intermediary member having:
cooperating means for cooperating with each of said connecting means of said two coupling components;
an internal bore;
a spacer member insertable in and withdrawable from said internal bore and having planar end faces;
first spacer means for location between one of said planar end faces of said spacer member and the annular plano portion of one of said lens means; and
second spacer means for location between the other of said planar end faces of said spacer member and the annular plano portion of the other of said lens means;
each of said spacer means serving to maintain parallelism of its respective planar end face and annular plano portion when said lens means are biased towards said spacer member by said biasing means, said spacer member causing attenuation if said spacer member planar end faces are non-parallel and zero attenuation if said spacer member planar end faces are parallel.

18. An attenuating connector as claimed in claim 17, wherein:
said planar end faces of said spacer member are other than parallel whereby attenuation of a value other than zero is selectively and controlledly effected by the connector.

19. An attenuating connector as claimed in claim 18, wherein the inclination $\theta$ of an end face of said spacer member to the axis of the spacer member is determined by the relationship $$T = e^{-(\frac{f\tan\Theta}{N\omega_o})^2}$$

wherein
T is the transmission factor
f is the focal length of the lens
N is the index of refraction of the material of the lens
$\omega_o$ is the $1/e^2$ semidiameter of the gaussian beam within the fiber.

* * * * *